UNITED STATES PATENT OFFICE 2,212,529

ORGANIC INSECTICIDE AND ITS USE

James William Swaine, Bayside, N. Y., assignor to General Chemical Company, New York, N. Y., a corporation of New York No Drawing. Application November 23, 1938, Serial No. 241,935

24 Claims. (Cl. 167—30)

This invention relates to insecticides. It is particularly directed to a new class of insecticidal compounds for combatting an unusually wide variety of insects.

The insecticides of the present invention may be used as stomach poison insecticides in combatting chewing insects, such as the larvae of moths and butterflies, larval and adult beetles, grasshoppers and crickets, insects which feed on exposed liquids and solids such as the housefly and fruitflies, and insects such as thrips which lacerate the epidermis of plants and suck up the exuding sap. On the other hand, they may be used as contact insecticides against sucking insects such as green and brown chrysanthemum aphids, green peach aphids, kale aphids, and green cabbage aphids.

The insecticides of the present invention are organic compounds containing not less than eight and not more than eighteen carbon atoms and are characterized by the common nucleus represented by the general formula:

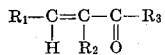

wherein $R_1$ represents a furyl or phenyl radical, $R_2$ represents H or an alkyl $(C_nH_{2n+1})$ or acyl radical, and $R_3$ represents (a) an open, straight or branched carbon chain, which may contain one or more carbon atoms, or (b) a phenyl, a naphthyl, or a furyl radical, or (c) a mixed radical consisting of an open, straight or branched carbon chain (a) and a phenyl, naphthyl, or furyl group (b).

When employed against chewing and similar insects as stomach poisons, the insecticides of the present invention may be applied to fruit, foliage, or other food of the insect to be combatted. When employed as contact insecticides, they may be sprayed directly upon the insects.

The insecticides of the present invention are compatible with and therefore may be used in combination with fungicides, other insecticides, and supplementary materials such as hydrated lime, diluents, and sticking, spreading, and wetting agents commonly used in combination with insecticides. They may be used as dispersions in liquids or alone as dusts or liquids.

The preferred compounds of the present invention are those which contain only the elements carbon, hydrogen, and oxygen, and in which the oxygen is present only in the keto group or only in the keto group and one or more furyl groups.

The following results, obtained in testing typical compounds within the purview of the present invention, demonstrate the efficiency of the new insecticides in combatting insects in general. Each compound was tested against one or more types of insects and was employed as a solution or a suspension in a suitable liquid medium. Tests upon aphids were conducted by spraying leaves, upon which aphids were feeding, with the solution or suspension of insecticide and counting dead and live aphids at the end of 24 hours. Tests upon codling moth larvae were conducted by spraying fruit with the solution of insecticide, draining, applying larvae to the treated fruit and counting dead and live larvae at the end of 24 hours. BTW designates a benzene, triethanolamine-oleate, water suspension prepared by dissolving the compound in a minimal quantity of benzene, about 1½ cc. for each ¾ to 1 gram of compound, adding the solution to a suspension of about 1½ cc. of triethanolamine-oleate in 20 cc. of water, and diluting with water to the indicated proportion. The letter "A" preceding the efficiency figure stands for brown chrysanthemum aphids, the letter "B" for green chrysanthemum aphids, the letter "C" for green cabbage aphids, the letter "D" for green peach aphids, and the letter "E" for codling moth larvae. Check tests were run in each case without insecticide.

The efficiency of control in the expression of results below is calculated as follows:

From the percentage of dead insects resulting from treatment with the insecticide, the percentage of dead insects in the check test is subtracted, and this difference is divided by the difference in the percentage of dead insects in the check test and 100%. Thus, where a kill of 90% was obtained with the insecticide and 22% without insecticide, the "Efficiency" rating is obtained as follows: 90—22=68, 100—22=78, and 68÷78=.87, giving an efficiency of 87%.

| | | Efficiency per cent |
|---|---|---|
| Difurfural-acetone ½% in BTW | D | 68 |
| Difurfural-acetone ⅖% in BTW | A | 80 |
| Difurfural-acetone 1% in acetone | E | 93 |
| Difurfural-acetone 1% in suspension in water | E | 61 |
| Furfural-acetophenone ¼% in BTW | A | 99 |
| Furfural-acetophenone ⅛% in BTW | A | 92 |
| Furfural-acetophenone 1/12% in BTW | A | 89 |
| Furfural-acetophenone ⅛% in BTW | C | 70 |
| Furfural-methyl-n-amyl-ketone 1/12% in BTW | A | 87 |
| Furfural-methyl-n-amyl-ketone ⅛% in BTW | C | 75 |

| | Efficiency per cent |
|---|---|
| Furfural-methyl-n-hexyl-ketone ⅛% in BTW ————————————————A__ | 96 |
| Furfural-methyl-n-hexyl-ketone ¹⁄₃% in BTW ————————————————A__ | 96 |
| Furfural-methyl-n-hexyl-keytone ⅛% in BTW ————————————————C__ | 70 |
| Furfural-methyl-isobutyl-ketone 1% in BTW ————————————————A__ | 77 |
| Furfural-pinacoline ¼% in BTW ———A__ | 98 |
| Benzal-acetophenone ²⁄₁₅% in BTW ——A__ | 93 |
| Benzal-acetophenone ²⁄₁₅% in BTW ——B__ | 91 |
| Benzal-acetophenone ½% in BTW ———D__ | 91 |
| Benzal-acetophenone 1% in acetone ——E__ | 80 |
| Benzal-benzyl-acetone 1% in acetone ——E__ | 70 |

The following additional compounds have been found to possess activity against codling moth larvae or aphids as indicated.

Furfural-acetone (E)
4-methoxy-benzal-acetophenone (E),
Furfural-beta-acetonaphthone (A) and (E),
Benzal-pinacoline (A),
Furfural - 2-methyl - 5 - isopropyl - acetophenone (C),
Furfural-methyl-nonyl-ketone (C),
1-furfural-propiophenone (A),
1-furyl-2,2-diaceto-ethene (condensation product of α-furfural and acetyl-acetone) (C),
Dibenzal-acetone (D),
Di-(m-nitrobenzal)-acetone (E),
Furfural - isopropylidene - acetone (condensation product of α-furfural and mesityl oxide) (A).

I claim:

1. An insecticide comprising an organic compound containing not less than 8 and not more than 18 carbon atoms and consisting essentially of the nucleus:

$$R_1-\underset{\underset{H}{|}}{C}=\underset{\underset{R_2}{|}}{C}-\underset{\underset{O}{\|}}{C}-R_3$$

$R_1$ representing a furyl or phenyl radical, $R_2$ representing H or an alkyl or acyl radical, and $R_3$ representing a straight or branched carbon chain, a phenyl, a naphthyl, or a furyl radical, or a mixed radical consisting of a straight or branched carbon chain and a phenyl, naphthyl, or furyl group.

2. An insecticide comprising an organic compound containing only the elements carbon, hydrogen, and oxygen and containing not less than 8 and not more than 18 carbon atoms, and consisting essentially of the nucleus:

$$R_1-\underset{\underset{H}{|}}{C}=\underset{\underset{R_2}{|}}{C}-\underset{\underset{O}{\|}}{C}-R_3$$

$R_1$ representing a furyl or phenyl radical, $R_2$ representing H or an alkyl or acyl radical, and $R_3$ representing a straight or branched carbon chain, a phenyl, a naphthyl, or a furyl radical, or a mixed radical consisting of a straight or branched carbon chain and a phenyl, naphthyl, or furyl group.

3. An insecticide comprising an organic compound containing only the elements carbon, hydrogen, and oxygen and containing not less than 8 and not more than 18 carbon atoms, and consisting essentially of the nucleus:

$$R_1-\underset{\underset{H}{|}}{C}=\underset{\underset{R_2}{|}}{C}-\underset{\underset{O}{\|}}{C}-R_3$$

$R_1$ representing a furyl or phenyl radical, $R_2$ representing H or an alkyl or acyl radical, and $R_3$ representing a straight or branched carbon chain, a phenyl, a naphthyl, or a furyl radical, or a mixed radical consisting of a straight or branched carbon chain and a phenyl, naphthyl, or furyl group, said compound being free from oxygen other than that in the keto group of the formula or in a furyl group.

4. An insecticide comprising difurfural-acetone.

5. An insecticide comprising furfural-acetophenone.

6. An insecticide comprising benzal-acetophenone.

7. The method of combatting chewing insects, which comprises applying to the food of the insect an insecticide of the type defined by claim 1.

8. The method of combatting chewing insects, which comprises applying to the food of the insect an insecticide of the type defined by claim 2.

9. The method of combatting chewing insects, which comprises applying to the food of the insect an insecticide of the type defined by claim 3.

10. The method of combatting codling moth larvae, which comprises applying to the food of the insect an insecticide of the type defined by claim 4.

11. The method of combatting codling moth larvae, which comprises applying to the food of the insect an insecticide of the type defined by claim 6.

12. The method of combatting sucking insects, which comprises applying to the insect an insecticide of the type defined by claim 1.

13. The method of combatting sucking insects, which comprises applying to the insect an insecticide of the type defined by claim 2.

14. The method of combatting sucking insects, which comprises applying to the insect an insecticide of the type defined by claim 3.

15. The method of combatting brown chrysanthemum aphids, which comprises applying to the aphids an insecticide comprising difurfural-acetone.

16. The method of combatting aphids, which comprises applying to the aphids an insecticide comprising furfural-acetophenone.

17. The method of combatting aphids, which comprises applying to the aphids an insecticide comprising benzal-acetophenone.

18. An insecticide comprising an organic compound containing not less than 8 and not more than 18 carbon atoms and consisting essentially of the nucleus:

$$R_1-\underset{\underset{H}{|}}{C}=\underset{\underset{R_2}{|}}{C}-\underset{\underset{O}{\|}}{C}-R_3$$

$R_1$ representing a furyl or phenyl radical, $R_2$ representing H or an alkyl or acyl radical, and $R_3$ representing a carbon chain, a phenyl, a naphthyl, or a furyl radical, or a mixed radical consisting of a carbon chain and a phenyl or furyl group.

19. The method of combatting chewing insects which comprises applying to the food of the insect an insecticide of the type defined by claim 18.

20. The method of combatting codling moth larvae, which comprises applying to the food of the larvae an insecticide of the type defined by claim 18.

21. The method of combatting sucking insects, which comprises applying to the insect an insecticide of the type defined by claim 18.

22. The method of combatting aphids, which comprises applying to the aphids an insecticide of the type defined by claim 18.

JAMES WILLIAM SWAINE.